Jan. 13, 1925.  1,523,149
E. B. WHEELER
MEANS FOR CONTROL OF ELECTRIC IMPULSES
Filed Nov. 15, 1923
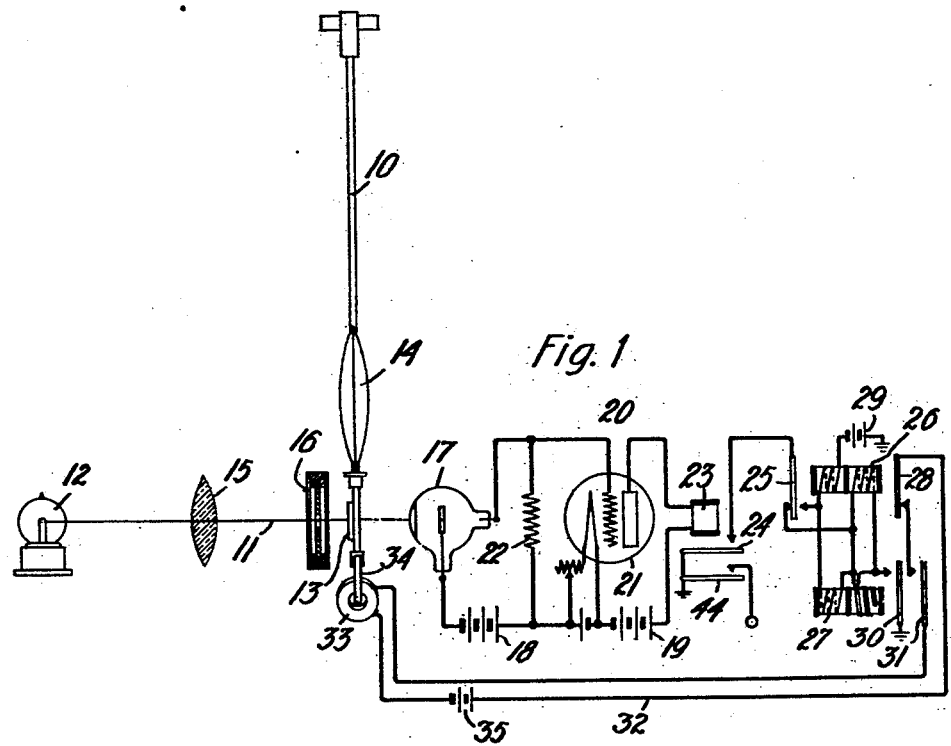
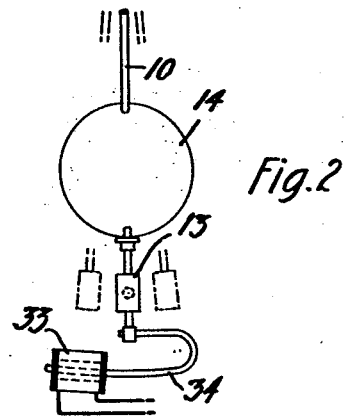
Inventor:
Edmund B. Wheeler:
by [signature] Atty Patented Jan. 13, 1925.

1,523,149

UNITED STATES PATENT OFFICE.

EDMUND B. WHEELER, OF NEW YORK, N. Y., ASSIGNOR TO WESTERN ELECTRIC COMPANY, INCORPORATED, OF NEW YORK, N. Y., A CORPORATION OF NEW YORK.

MEANS FOR CONTROL OF ELECTRIC IMPULSES.

Application filed November 15, 1923. Serial No. 674,900.

*To all whom it may concern:*

Be it known that I, EDMUND B. WHEELER, a citizen of the United States, residing at New York, in the county of New York, State of New York, have invented certain new and useful Improvements in Means for Control of Electric Impulses, of which the following is a full, clear, concise, and exact description.

This invention relates to means for control of electric impulses.

An object of this invention is to produce pulses as a means for indicating time intervals.

Another object of the invention is to produce a source of electrical impulses of equal intervals and equal duration for indicating time.

A further object is to produce a succession of equally spaced electrical impulses and to utilize these impulses to control the motion of an oscillatory body.

Another object is to produce electrical impulses under control of a pendulum and to utilize the impulses for maintaining the pendulum in continuous and constant oscillation.

A feature of this invention is the means utilized to cause electrical pulses to drive a pendulum which is conductively independent of an electrical circuit.

Another feature of the invention relates to means for imparting to an oscillating body a single driving impulse corresponding to a plurality of electrical impulses generated under the control of said oscillating body.

A more specific feature of the invention relates to a system of relays supplied with energy from an amplifier controlled by a swinging pendulum for operating a driving solenoid once for each oscillation of the pendulum.

This system may comprise a relay for closing an electric circuit which relay may be operated by energy from a thermionic amplifier arranged to be controlled by the action of a beam of light impressed upon a photo-electric cell connected in the input circuit of the amplifier. In order to cause the relay to produce a succession of electrical impulses which shall be of equal duration and separated by equal intervals, an oscillating pendulum provided with an opaque body is arranged so that the opaque body intercepts the light beam impressed upon the photo-electric cell. This interception takes place preferably at the midpoint of the oscillation of the pendulum. It is thus evident that the light beam is twice intercepted for each oscillation of the pendulum. The relay is thereby caused to produce two pulses for each oscillation of the pendulum.

The beam of light may comprise rays not only within the visible spectrum but also ultra violet or infra red rays or the shorter electromagnetic rays such as X-rays and gamma rays. The opaque body may be of any material not transparent to the particular rays used. Thus when X-rays are used it may be for example lead.

The invention provides a system of relays controlled by the first mentioned relay for obtaining a single pulse for each two pulses of the first mentioned relay. These single pulses are supplied to a solenoid arranged to exert a driving force upon the pendulum preferably at the mid point of its swing.

In the figures of the drawing, an embodiment of the invention is illustrated as follows:

Fig. 1, a system for producing a succession of equal electrical impulses and for maintaining a pendulum in continuous oscillation under control of these impulses.

Fig. 2, a view of the portion of the pendulum indicating the arrangement of the driving solenoid and the opaque body.

Referring to Figures 1 and 2, the pendulum 10 is arranged to oscillate at right angles to a beam of light 11 from the source 12. An opaque body 13 is mounted on the pendulum in such manner as to intercept the beam of light preferably when the pendulum is at the mid point of its swing. A lens and shutter 15 and 16, respectively, are arranged to focus the beam of light from the source 12 on the photo-electric cell 17. This cell is connected in series with the battery 18 to the input of a thermionic amplifier 20 comprising a three electrode electron discharge tube 21. A resistance 22 is connected between the grid and filament of tube 21. The relay 23 in series with a battery 19 is connected between the plate and filament of tube 21. This relay is arranged to operate armatures 24 and 44 forming a portion of external electric circuits.

The relay 23 controls by means of its armature 24 the operation of a pair of relays 26 and 27 having double windings. Relay 26 has two inductive windings and relay 27 has one inductive and one non-inductive winding. The latter winding is connected in shunt to one winding of relay 26, whereas the inductive winding of relay 27 is arranged in series between the two windings of relay 26. The relays 26 and 27 control armatures 28 and 31 connected in the circuit of solenoid 33. The front armature 30 of relay 27 supplies a shunt-path to ground for causing the release of relays 26 and 27. Armature 25 of relay 26 is arranged to control the operating circuit of relay 27 and the locking circuit of relay 26.

A battery 35 is provided for energizing solenoid 33.

The armature 34 of solenoid 33 consists of a hook-shaped bar of magnetic material attached to the lower end of pendulum 10 in such manner that as the pendulum swings, one end of the hook or armature 34 is inserted in and withdrawn from the solenoid.

The system operates as follows: The photo-electric cell and the light source are so arranged that the light from the lamp 12 is constantly focused on the photo-electric cell 17 by means of the lens 15 except for a momentary interval when the opaque body 13 of the pendulum 10 cuts off the light at the mid point of the swing. The battery 18 and cell 17 are so adjusted that the potential impressed upon the grid of tube 21 is sufficiently negative to prevent the flow of space current from the filament to the plate. Relay 23 is therefore inoperative. However, when the opaque body 13 momentarily cuts off the light from photo-electric cell 17, the resistance of the cell becomes instantly substantially infinite. The charge on the grid of tube 21 leaks off through resistance 22 and space current flows from plate to filament and in the external circuit connected between them causing the operation of relay 23.

Relay 23 on operation closes the contacts of armatures 24 and 44. Armature 44 may be arranged to provide impulses in any desired external circuit connected thereto. Armature 24, which is connected to ground, closes the circuit of relay 27 which closes its own locking circuit by contact of armature 30. Armature 31 of relay 27 closes the circuit of solenoid 33.

It will be remembered that at this instant the pendulum 10 is at the mid point of its oscillation. When the opaque body 13 passes out of the path of light 11, photo-electric cell 17 is sensitized thereupon by light from the source 12. This reestablishes the negative potential of the grid of tube 21 causing the deenergization of relay 23 and its consequent release.

Upon release of this relay armature 24 opens its associated contact which has maintained a short circuit upon one winding of relay 26 so that now relay 26 is operated by current from battery 29 flowing to ground via the inner contact of armature 30. The operation of relay 26 opens the circuit 32 of solenoid 33 at the contact of armature 28 and prepares the release circuit of relay 27 at the front contact of armature 25. At the next operation of relay 23, relay 27 is connected in a short circuit as follows: Ground, contact of armature 24, front contact of armature 25, inductive winding of relay 27, non-inductive winding of relay 26 in parallel, conductive winding of armature 30 to ground. Relay 27 thereupon releases, opening a contact in its locking circuit at the armature 30. Upon the subsequent release of relay 23, relay 26 is released and the system restored to its normal condition. This cycle of operation recurs for every oscillation of the pendulum 10.

The duration of the pulses produced in circuit 32 and in the circuit connected to the contact armature 44 may be determined by adjusting the size of the opaque element 13 so that the light beam 11 will be cut off from the photo-electric cell for longer or shorter intervals. The length of periods between pulses may be determined by adjusting the period of the pendulum 10. This may be accomplished by varying the position or magnitude of a weight 14 attached to the pendulum. Thus it is evident that pulses of any desired duration or interval may be obtained.

The embodiment of this invention described and illustrated is merely representative of the application of the principles involved and is not to be construed as limiting its scope.

What is claimed is:

1. In a time signal system which comprises means for intercepting a beam of light at equal time intervals, means sensitive to said light beam and means for producing electrical pulses in accordance with the interception of said light beam and additional means for causing said pulses to actuate said means for intercepting a beam of light.

2. A method of producing electrical pulses separated by equal time intervals which comprises producing variations of a light beam, said variations being of constant time period, controlling the flow of electrons in a space discharge tube in accordance with variations of said beam of light, and causing said electrical pulses to control the variations of said light beam.

3. A method of producing time signals which comprises producing a succession of equally spaced electrical pulses in accordance with the pulses of a light beam and controlling the period of pulses of said light beam by means of said electrical pulses.

4. A time signal system which comprises means for producing a beam of light, a pendulum for intercepting said beam at equal intervals of time, a photo-electric cell, arranged to be sensitized by said beam of light, said photo-electric cell being connected in the input circuit of a thermionic amplifier supplying energy to a relay whereby variations in said light beam are caused to control the flow of current in said relay, and means under control of said relay for maintaining said pendulum in continuous oscillation.

5. The combination in a time signaling system, a pendulum arranged to intercept a beam of light, a thermionic amplifier comprising an input circuit and an output circuit, a photo-electric cell connected in said input circuit and arranged to be sensitized by said light beam, and means associated with the output circuit of said amplifier for impressing driving force upon said pendulum.

6. The combination of means for producing electrical pulses at equal intervals of time and means for driving a pendulum in accordance with said pulses, said means comprising a solenoid having an armature attached to said pendulum, said armature being movably positioned within the coil of said solenoid.

7. The combination with means for producing electrical pulses, of a relay, a thermionic amplifier connected to said relay and a pendulum for causing the operation of said relay a plurality of times during each oscillation thereof, and means under control of said relay for impressing the driving force upon said pendulum once for a given plurality of pulses of said relay.

In witness whereof, I hereunto subscribe my name this 12th day of November A. D., 1923.

EDMUND B. WHEELER.